E. A. BRANDENBURG.
LOCKING DEVICE FOR VALVES.
APPLICATION FILED SEPT. 10, 1907. RENEWED DEC. 10, 1908.
924,423.
Patented June 8, 1909.
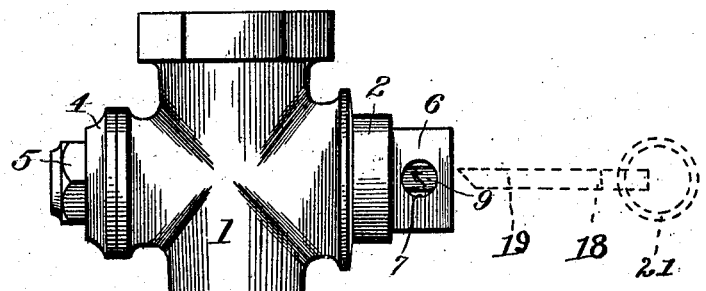
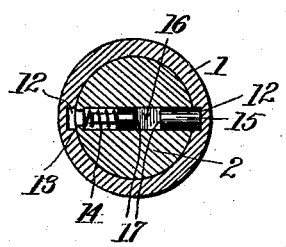
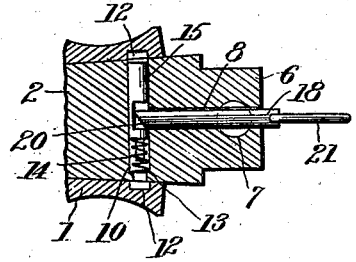
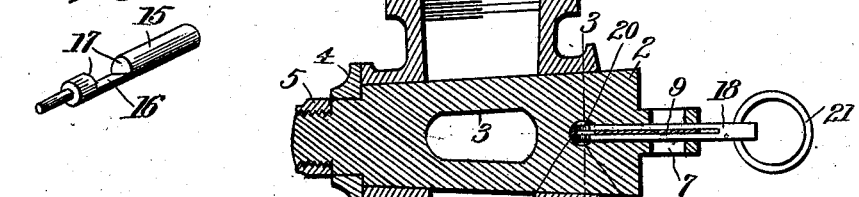
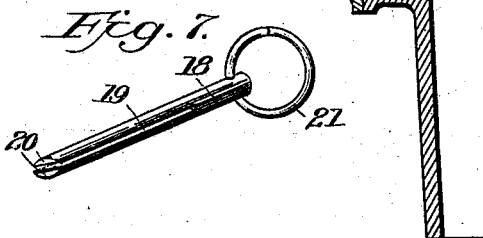
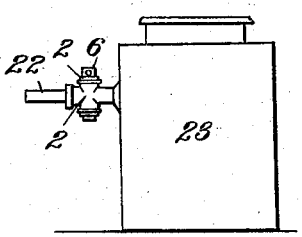
WITNESSES:
C. H. Walker.
J. T. Walker.
INVENTOR
Edward A. Brandenburg
BY E. E. Vrooman,
his Attorney.

UNITED STATES PATENT OFFICE.

EDWARD A. BRANDENBURG, OF LOS ANGELES, CALIFORNIA.

LOCKING DEVICE FOR VALVES.

No. 924,423.  Specification of Letters Patent.  Patented June 8, 1909.

Application filed September 10, 1907, Serial No. 392,219. Renewed December 10, 1908. Serial No. 466,910.

*To all whom it may concern:*

Be it known that I, EDWARD A. BRANDENBURG, a citizen of the United States, residing at Los Angeles, in the county of Los Angeles and State of California, have invented certain new and useful Improvements in Locking Devices for Valves, of which the following is a specification, reference being had therein to the accompanying drawing.

This invention relates to an improvement in locking devices for valves, and has for its object the improvement of the construction of a locking device for normally preventing movement, preferably, a rotatable valve.

Another object of the invention is the production of a locking device for a rotary valve, which is comparatively simple to construct, inexpensive to manufacture, and efficient in operation.

With these and other objects in view, the invention consists of certain novel constructions, combinations, and arrangements of parts, as will be hereinafter fully described and claimed.

In the drawings: Figure 1 is a view in side elevation of a device constructed in accordance with the present invention. Fig. 2 is a vertical, sectional view of the structure depicted in Fig. 1, showing the valve turned at right-angles to the position shown in Fig. 1. Fig. 3 is a sectional view taken on line 3, 3, Fig. 2, the key being removed. Fig. 4 is a fragmentary, sectional view of the valve-casing, and showing, in side elevation, my improved locking device. Fig. 5 is a view in side elevation of a gas meter and my improved device attached thereto. Fig. 6 is a perspective view of a sliding bolt. Fig. 7 is a perspective view of the key.

Referring to the drawings by numerals, 1 designates a valve casing, and 2 a rotatable valve mounted therein. The valve 2 is provided, preferably, with a port 3. A washer or ring 4 is, preferably, positioned upon the lower end of the valve, and a nut 5 is threaded upon said lower end for securing the valve in position upon the casing 1. The valve 2 is provided at its upper end with a squared portion 6, and by means of which the valve may be easily rotated either by the operator grasping said squared or flanged portion 6 with his hand, or with some tool, as for instance, a monkey-wrench. However, I have found from practical experience that the key of my device, hereinafter described, is sufficient to rotate the valve for either opening or closing port 3. The valve 2 is, preferably, provided in the squared portion 6 with a horizontal aperture 7 and with a longitudinally-extending, primary aperture 8. A guard 9 is positioned within the aperture 8, and, preferably, extends across the aperture or sight-opening 7. This sight-opening or aperture 7 enables the operator to read any suitable markings, as for instance the inclined arrow, Fig. 1, that is placed upon the guard 9 for indicating the proper positioning of the key within the valve, for actuating the sliding bolt, hereinafter described. The guard 9 preferably extends longitudinally of the valve 2. The valve 2 is provided with a transverse aperture 10, which may be formed by boring out the valve. It will be noted that owing to the round or cylindrical structure of the aperture 10, the same can be formed in the valve quickly and comparatively cheap.

Upon, preferably, opposite sides of the casing 1 are sockets or cut-out portions 12, which are adapted to register with the aperture 10. One end of the aperture 10 is partly closed by an annular flange 13, against which rests the outer end of spring 14, which spring 14 constitutes a yielding member pressing against the inner end of cylindrical bolt 15. The bolt 15 is provided, preferably, with an extension upon its inner end, surrounded by spring 14. The cylindrical bolt 15 is provided with a squared cut-out portion 16, having vertical, transverse end-walls 17, 17.

The key 18 is provided with a longitudinally-extending slit 19, producing a split or bifurcated body that is beveled or chamfered at its lower end 20. The upper end is provided with a suitable grip, preferably, a ring 21.

When it is desired to unlock the valve, it is only necessary to insert the key 18 into the aperture 8, causing the sides of the body to straddle the guard 9 and force the key into the valve far enough for causing the beveled lower end 20 to ride over one of the transverse, vertical walls 17, thereby sliding the bolt 15 within the aperture 10, causing the front end of the bolt to move from engagement with a recess 12, see Fig. 4. After the bolt has been slid so as to unlock the valve 2, said valve can be easily rotated by the operator exerting a turning movement upon the handle or ring 21 of the key.

If a person has not a key constructed in accordance with the present invention, the valve can not be rotated, as the guard will prevent tampering with the sliding bolt. No foreign object can be manipulated in the valve. In practical use, I may position my device on a supply pipe 22 contiguous to a gas meter 23.

In my device, I only employ a single sliding bolt, which will lock the valve upon the same being rotated one-half of a complete revolution; furthermore, the recesses 12 are not positioned at the upper edge of the valve casing, but are formed intermediate the ends of the valve casing, so that it is impossible to tamper with or examine the bolt 15 until the valve has been unlocked, even though the washer 4 and the nut 5 are removed. It is to be noted that owing to the simple structure of my locking device, the same can be applied to and is particularly adapted to be assembled with an ordinary valve and valve casing. The apertures or passages for the sliding bolt and the key can be easily bored or cut out of an ordinary valve and casing, and the piece of steel, constituting the guard 9, quickly inserted in one of the apertures, as before described. The cylindrical or round structure of my sliding bolt 15 is of great importance, as said bolt may be formed from an ordinary piece of steel or metal having a curved contour, besides, it must be borne in mind that owing to the cylindrical formation of the aperture or bolt-receiving compartment 10, the round or cylindrical bolt fits snug within this aperture or compartment. Owing to the partially closed end of aperture or compartment 10, produced by the annular flange 13, the aperture or compartment 10 can be easily cleaned, whereby the sliding movement of the bolt 15 will not be interfered with.

It is to be noted that the guard 9 constitutes means for preventing the key 18 from being rotated in the valve 2, thereby permitting said key to perform the function of a stationary handle for rotating the valve 2. It will be obvious that the key not only operates the sliding bolt, but also performs the function of a handle for rotating the valve.

What I claim is:

1. In a device of the character described, the combination with a casing, of a rotatable valve mounted in said casing, an extension integral with said valve and provided with a longitudinally-extending opening and a transverse sight opening, said longitudinal opening terminating at its inner end in a transverse opening, a spring-pressed locking bolt slidable in the last-mentioned transverse opening, a flat guard plate extending through the longitudinal opening, and a split key adapted to straddle said guard plate to operate said locking bolt.

2. In a device of the character described, the combination with a casing, of a rotatable valve mounted within said casing, said valve provided at one end with a squared extension, said squared extension provided with an aperture, said valve provided with a longitudinally-extending aperture communicating with said aperture of the extension, said valve provided with a transverse aperture communicating with said longitudinally-extending aperture, a flat, longitudinally-extending guard positioned in the longitudinally-extending aperture, locking means positioned in said transverse aperture, and means adapted to be positioned upon opposite sides of said guard and engage and actuate said locking means.

3. In a device of the character described, the combination with a casing, of a rotatable valve mounted therein and provided with a transverse opening near one end and a longitudinal opening communicating with said transverse opening, a locking bolt slidable in said transverse opening, a spring coiled about the locking bolt and bearing against said valve to force the said bolt into engagement with the casing, a guard plate extending through the longitudinal opening of the valve, and a split key adapted to straddle said guard plate to operate said locking bolt.

In testimony whereof I hereunto affix my signature in presence of two witnesses.

EDWARD A. BRANDENBURG.

Witnesses:
Jas. D. Kennedy,
Jas. F. Barnhill.